(12) United States Patent
Kamal

(10) Patent No.: US 11,584,413 B2
(45) Date of Patent: Feb. 21, 2023

(54) CONVERTIBLE HAND TRUCK AND CHAIR DEVICE

(71) Applicant: Farzin Kamal, Ontario, CA (US)

(72) Inventor: Farzin Kamal, Ontario, CA (US)

( * ) Notice: Subject to any disclaimer, the term of this patent is extended or adjusted under 35 U.S.C. 154(b) by 371 days.

(21) Appl. No.: 16/929,014

(22) Filed: Jul. 14, 2020

(65) Prior Publication Data

US 2022/0017130 A1  Jan. 20, 2022

(51) Int. Cl.
*B62B 1/12* (2006.01)
*A47C 1/14* (2006.01)
*A47C 7/00* (2006.01)
*A47C 4/28* (2006.01)

(52) U.S. Cl.
CPC .................. *B62B 1/12* (2013.01); *A47C 1/14* (2013.01); *A47C 4/28* (2013.01); *A47C 7/006* (2013.01); *B62B 2206/006* (2013.01)

(58) Field of Classification Search
CPC ................ B62B 1/12; B62B 2206/006; B62B 2205/006; B62B 2205/02; B62B 2205/104; B62B 2205/12; A47C 1/14; A47C 4/28; A47C 7/006; A47C 7/624; A47C 13/00
See application file for complete search history.

(56) References Cited

U.S. PATENT DOCUMENTS

| | | | |
|---|---|---|---|
| 5,062,650 A * | 11/1991 | Chang | A47C 13/00 280/30 |
| 5,161,811 A * | 11/1992 | Cheng | B62B 5/085 280/30 |
| 5,306,027 A * | 4/1994 | Cheng | B62B 1/045 280/30 |
| 5,542,740 A * | 8/1996 | Chang | A47C 13/00 280/30 |
| 5,669,659 A * | 9/1997 | Dittmer | A47C 13/00 D34/24 |
| 5,887,888 A * | 3/1999 | Tseng | B62B 1/12 297/188.05 |
| 7,316,407 B1 * | 1/2008 | Elden | B62B 5/085 280/47.34 |
| 7,441,785 B1 * | 10/2008 | Tsai | B62B 3/009 280/646 |

(Continued)

FOREIGN PATENT DOCUMENTS

| | | | | |
|---|---|---|---|---|
| CN | 105564470 A | * | 5/2016 | ............... B62B 1/12 |
| EP | 0272797 A1 | * | 6/1998 | |

(Continued)

*Primary Examiner* — James A Shriver, II
*Assistant Examiner* — Ian Bryce Shelton
(74) *Attorney, Agent, or Firm* — Pharar Patents & Intellectual Property; Andrew A. Pharar

(57) ABSTRACT

The convertible hand truck and chair device may combine the advantages of a wheeled hand truck with the advantages of a folding chair. Such a design may allow a user to transport large or heavy items from one location to another using the hand truck, and to then utilize the hand truck as a chair device for sitting. By way of example, a user going to the beach or a camp site may carry most or all of their needed items, such as coolers, foodstuffs, and other goods, to the beach or camp site location, and then convert the hand truck to a seat where they may sit or rest without the need to bring an additional chair. The device may further collapse down into a compact form factor for ease of transportation.

7 Claims, 11 Drawing Sheets

(56) References Cited

U.S. PATENT DOCUMENTS

| | | | |
|---|---|---|---|
| 8,740,298 B2* | 6/2014 | Kenttamaa-Squires | A47C 7/006 297/118 |
| 8,814,181 B1* | 8/2014 | Weldon | B62B 3/10 280/30 |
| 9,604,660 B1* | 3/2017 | Zuo | B62B 7/068 |
| 9,637,149 B1* | 5/2017 | Wang | B62B 1/002 |
| 10,053,130 B1* | 8/2018 | McNamara | B62B 7/10 |
| 10,506,803 B1* | 12/2019 | Wu | A47C 7/006 |
| 11,001,285 B1* | 5/2021 | Gayk | B62B 1/002 |
| 2012/0217773 A1* | 8/2012 | Jue | A47C 7/50 297/354.12 |
| 2018/0000252 A1* | 1/2018 | Weldon | A47C 13/00 |
| 2020/0107642 A1* | 4/2020 | Weldon | A47C 13/00 |
| 2020/0189637 A1* | 6/2020 | Karlsson | B62B 5/0495 |
| 2020/0223460 A1* | 7/2020 | Jian | B62B 1/12 |
| 2020/0405063 A1* | 12/2020 | Bulger | A47C 13/00 |

FOREIGN PATENT DOCUMENTS

| | | | | |
|---|---|---|---|---|
| FR | 3021853 A1 * | 12/2015 | | A47C 1/143 |
| FR | 3088044 A1 * | 5/2020 | | |
| KR | 20110001255 U * | 2/2011 | | |
| WO | WO-0215738 A1 * | 2/2002 | | A45C 13/385 |
| WO | WO-2010015111 A1 * | 2/2010 | | B62B 1/12 |

* cited by examiner

CONVERTIBLE HAND TRUCK AND CHAIR DEVICE

TECHNICAL FIELD OF THE INVENTION

The present invention relates in general to hand truck devices, and, more specifically, to a convertible hand truck and chair device.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

A hand truck is a wheeled device with a lift plate connected to a support frame, commonly used to lever and push or pull objects too large or too heavy for carrying by a single person. Hand trucks may vary in their design and number of support components, though generally comprise an L-shaped frame having two arms and one or more handgrips for control. Hand trucks generally comprise a pair of wheels attached behind the joint of the lift plate to the support frame, which may allow a user to tilt back the hand truck and roll it across a flat surface, thus facilitating the carrying of the large or heavy object.

Hand trucks may be made available in a number of variations that provide additional advantages in specific situations. By way of example, a hand truck may be designed with a wide lift plate allowing for the carrying of a large item such as, for example, a refrigerator or a washing machine. Other hand trucks may be designed with narrow lift plates and longer, more solid support structures to act as a pry lever bar. Yet another variation of the hand truck may comprise a combination of three or more wheels that articulate over uneven surfaces to facilitate the climbing or descending a flight of stairs.

A seat is a piece of furniture with a raised surface supported by legs, commonly used to hold a single person. Seats may vary in their design and number of legs, though generally comprise a relatively horizontal surface having three to five relatively vertical legs for support. A seat further comprising a relatively vertical support surface may be known as a chair. Seats and chairs may comprise a variety of materials of construction, though are commonly made from plastics, metals, woods, or some combination thereof. Seats and chairs may be further padded or upholstered or may comprise removably attached cushions for additional user comfort.

A folding seat is a seat that folds upon itself into a more compact form so as to occupy less space. Such a seat may be mounted to a vertical surface and may articulate up or down, or may be unmounted and may articulate relative to its vertical legs. A folding chair may be designed so that a chair back and chair seat may articulate relative to one another, and may further articulate relative to the vertical legs or may incorporate the vertical legs into the articulating action. Many folding chairs articulate at the seat, forming a side-x design, wherein the chair back support and the front legs are the same component.

No combination exists combining the advantages of a wheeled hand truck with the advantages of a folding chair. Such a design may allow a user to transport large or heavy items from one location to another using the hand truck, and to then utilize the hand truck as a chair device for sitting. By way of example, a user going to the beach or a camp site may carry most or all of their needed items, such as coolers, foodstuffs, and other goods, to the beach or camp site location, and then convert the hand truck to a seat where they may sit or rest without the need to bring an additional chair. The device may further collapse down into a compact form factor for ease of transportation.

Thus, there is a need in the art for a convertible hand truck and chair device that may allow a user to operate the device as a hand truck in a first orientation and as a chair in a second orientation so as to provide the inherent advantages of both devices. It is to these ends that the present invention has been developed.

BRIEF SUMMARY OF THE INVENTION

To minimize the limitations in the prior art, and to minimize other limitations that will be apparent upon reading and understanding the present specification, the present invention describes a convertible hand truck and chair device.

It is an objective of the present invention to provide a convertible hand truck and chair device that may comprise a hand truck.

It is another objective of the present invention to provide a convertible hand truck and chair device that may comprise a folding chair.

It is another objective of the present invention to provide a convertible hand truck and chair device that may comprise a main body assembly.

It is another objective of the present invention to provide a convertible hand truck and chair device that may comprise a truck assembly.

It is another objective of the present invention to provide a convertible hand truck and chair device that may comprise a seat frame assembly.

It is another objective of the present invention to provide a convertible hand truck and chair device that may comprise a collapsible seat frame assembly.

It is another objective of the present invention to provide a convertible hand truck and chair device that may comprise a plurality of articulating frame arms.

It is another objective of the present invention to provide a convertible hand truck and chair device that may comprise a plurality of crossbars.

It is another objective of the present invention to provide a convertible hand truck and chair device that may comprise a plurality of articulating hinges.

It is another objective of the present invention to provide a convertible hand truck and chair device that may comprise a plurality of locking hinges.

It is another objective of the present invention to provide a convertible hand truck and chair device that may comprise a plurality of collapsing hinges.

It is another objective of the present invention to provide a convertible hand truck and chair device that may comprise a plurality arm rests.

It is another objective of the present invention to provide a convertible hand truck and chair device that may comprise a plurality of cup holders.

It is another objective of the present invention to provide a convertible hand truck and chair device that may comprise a storage area.

It is another objective of the present invention to provide a convertible hand truck and chair device that may comprise a plurality of cargo netting.

It is another objective of the present invention to provide a convertible hand truck and chair device that may comprise a plurality of wheels.

It is another objective of the present invention to provide a convertible hand truck and chair device that may comprise a plurality of articulating wheel arms.

It is another objective of the present invention to provide a convertible hand truck and chair device that may comprise a collapsible axle.

It is another objective of the present invention to provide a convertible hand truck and chair device that may comprise a main body reversibly attached to a truck assembly.

It is another objective of the present invention to provide a convertible hand truck and chair device that may comprise a plurality of motorized wheels.

It is another objective of the present invention to provide a convertible hand truck and chair device that may comprise a plurality of accessories and receivers.

It is another objective of the present invention to provide a convertible hand truck and chair device that may comprise a braking system.

It is another objective of the present invention to provide a convertible hand truck and chair device that may comprise a resilient material of construction.

It is another objective of the present invention to provide a convertible hand truck and chair device that may comprise a water-proof material of construction.

It is another objective of the present invention to provide a convertible hand truck and chair device that may comprise a reusable material of construction.

It is another objective of the present invention to provide a convertible hand truck and chair device that may comprise a washable material of construction.

It is another objective of the present invention to provide a convertible hand truck and chair device that may comprise a multi-component construction.

It is another objective of the present invention to provide a convertible hand truck and chair device that may comprise an antimicrobial layer.

It is another objective of the present invention to provide a convertible hand truck and chair device that may comprise an antimicrobial material of construction.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The convertible hand truck and chair device may combine the advantages of a wheeled hand truck with the advantages of a folding chair. Such a design may allow a user to transport large or heavy items from one location to another using the hand truck, and to then utilize the hand truck as a chair device for sitting. By way of example, a user going to the beach or a camp site may carry most or all of their needed items, such as coolers, foodstuffs, and other goods, to the beach or camp site location, and then convert the hand truck to a seat where they may sit or rest without the need to bring an additional chair. The device may further collapse down into a compact form factor for ease of transportation.

Figure 1:
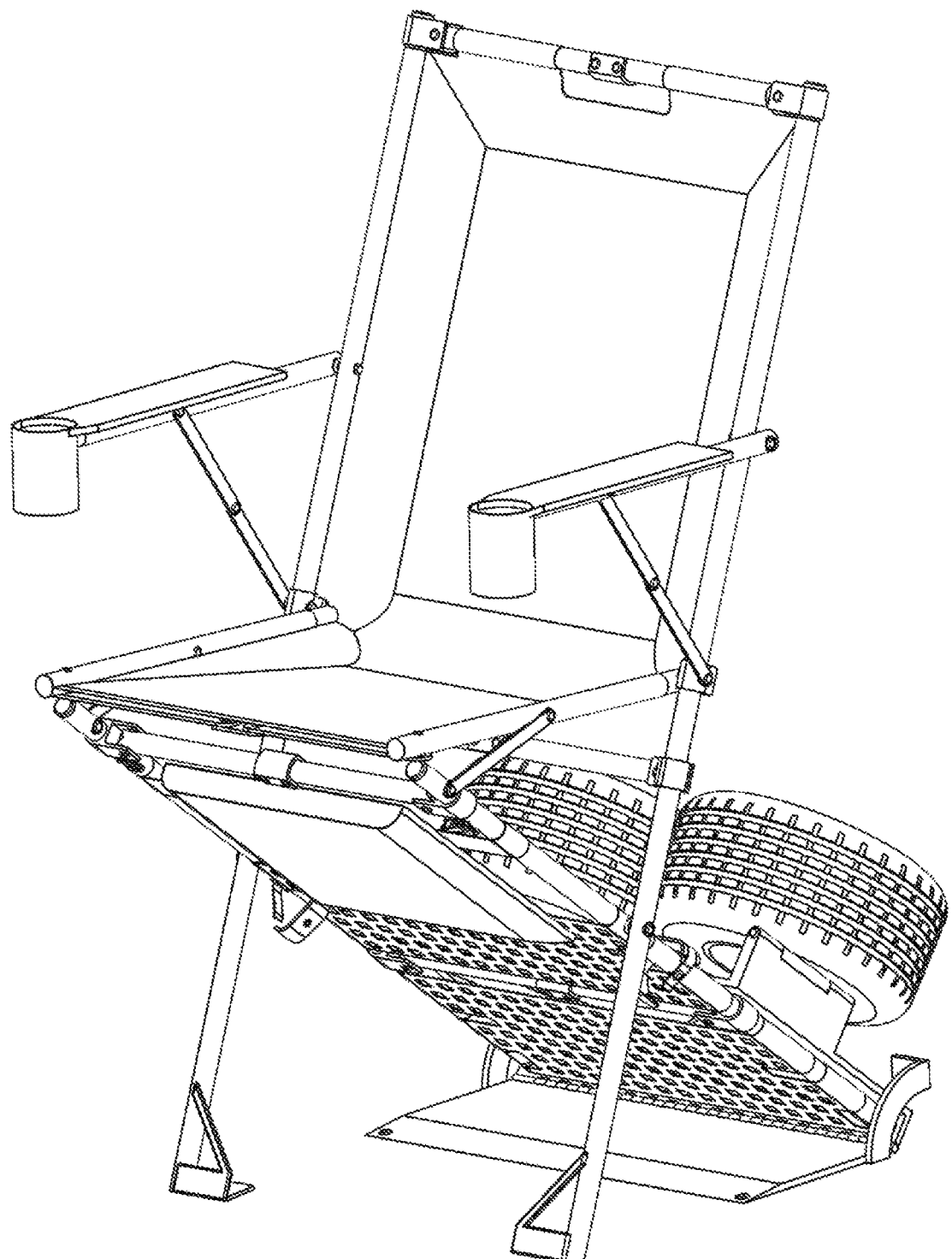
FIG. 1 is an isometric perspective view of a convertible hand truck and chair device in a chair orientation, as contemplated by the present disclosure.
Figure 2:
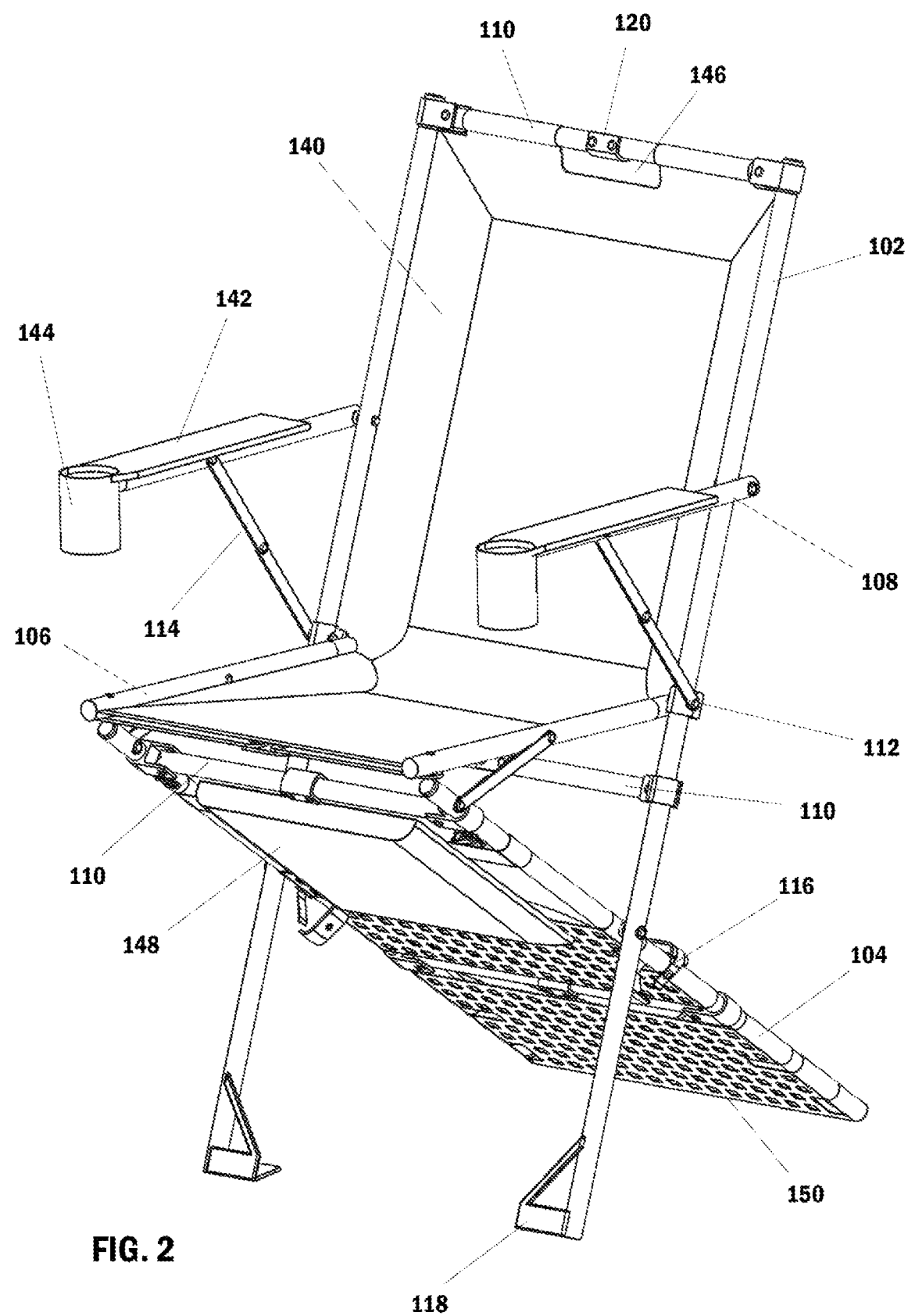
FIG. 2 is an isometric perspective view of a convertible hand truck and chair device in a chair orientation with truck assembly removed, as contemplated by the present disclosure.
Figure 3:
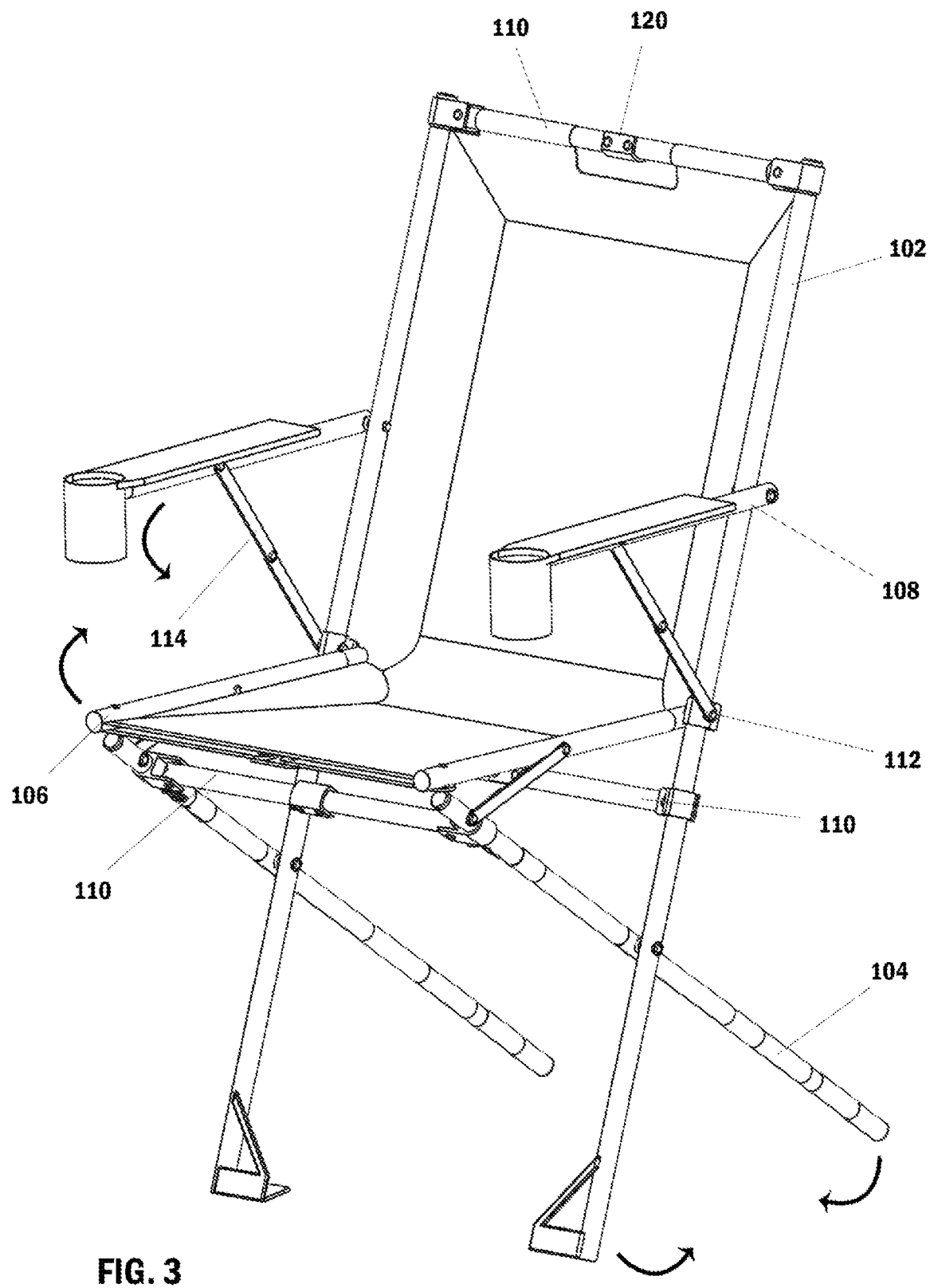
FIG. 3 is an isometric perspective view of a convertible hand truck and chair device in a chair orientation showing the relative motion of the plurality of support arms, as contemplated by the present disclosure.
Figure 4:
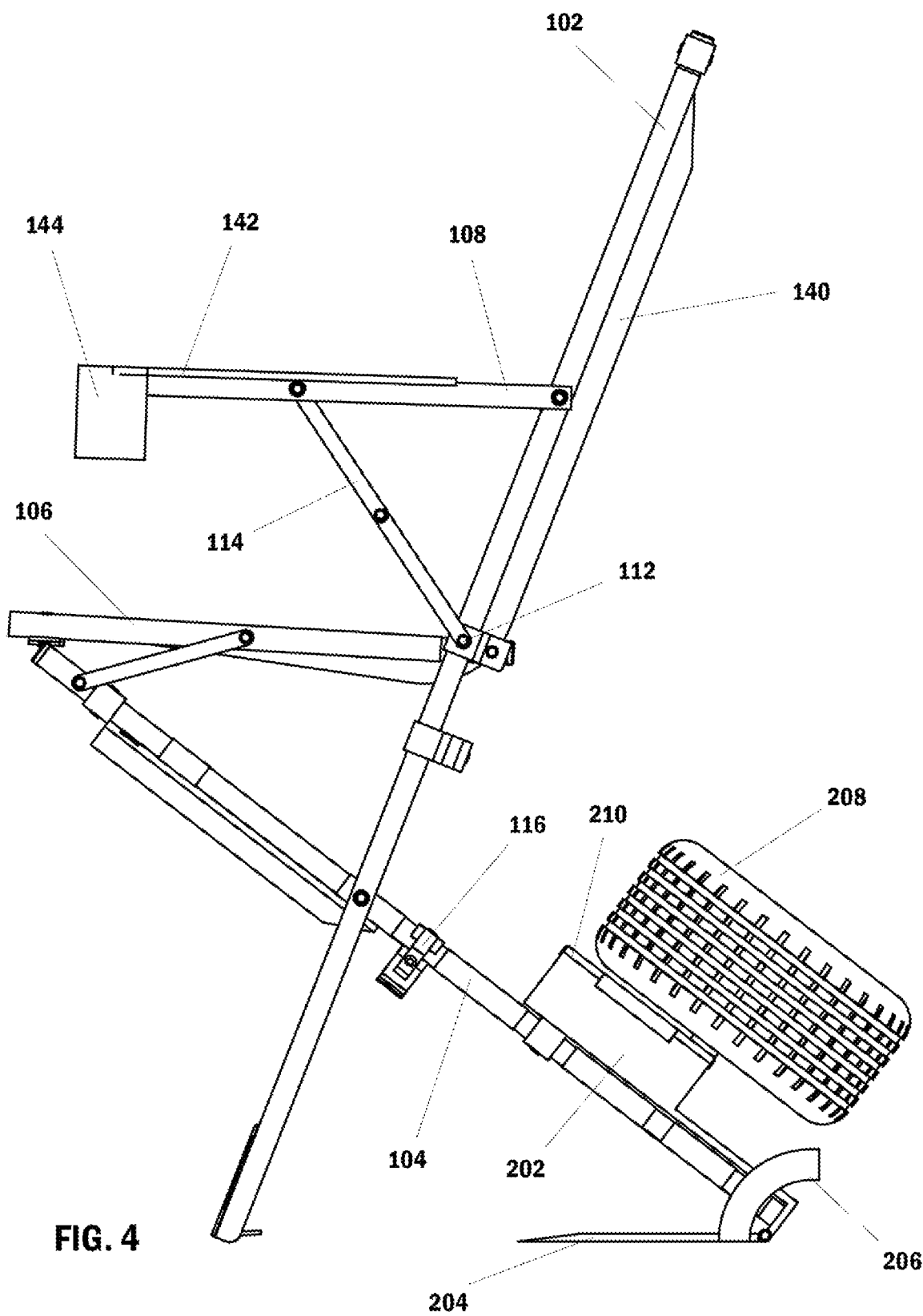
FIG. 4 is a left side elevation view of a convertible hand truck and chair device in a chair orientation, as contemplated by the present disclosure.
Figure 5:
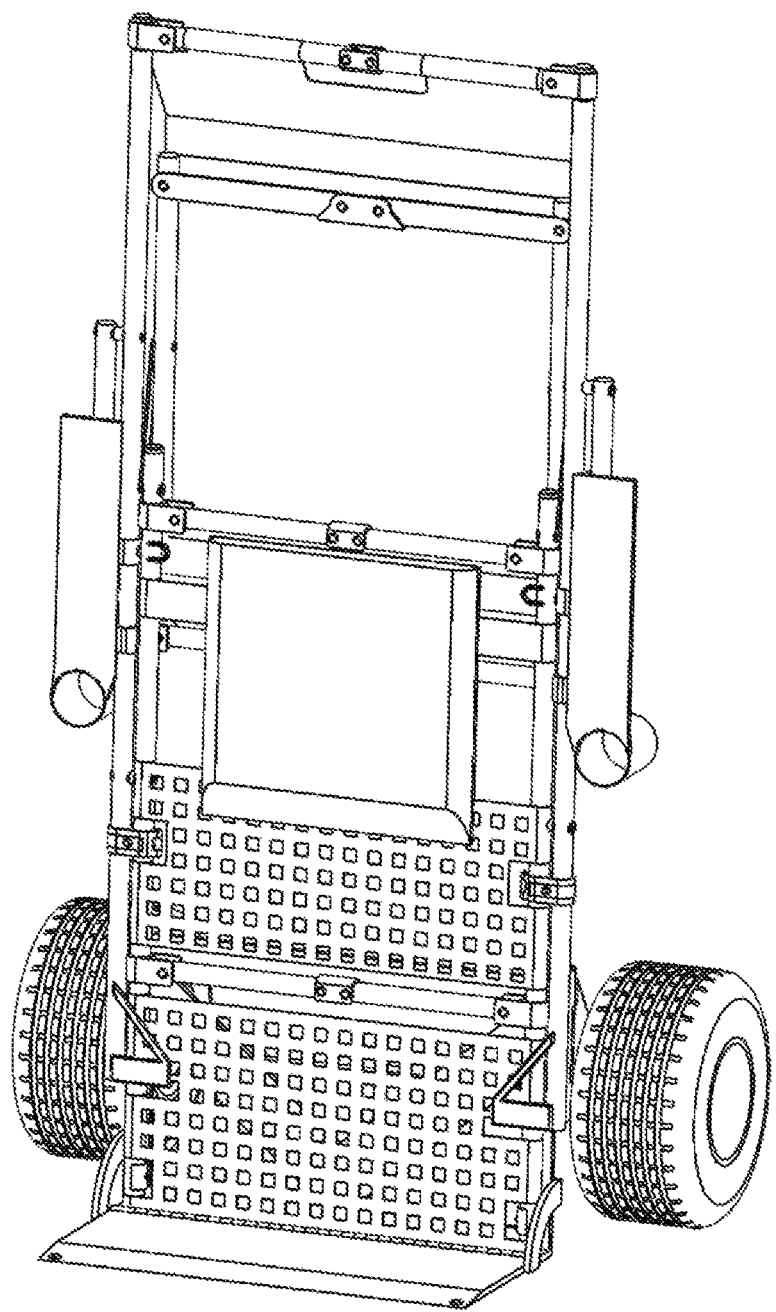
FIG. 5 is an isometric perspective view of a convertible hand truck and chair device in a hand truck orientation, as contemplated by the present disclosure.
Figure 6:
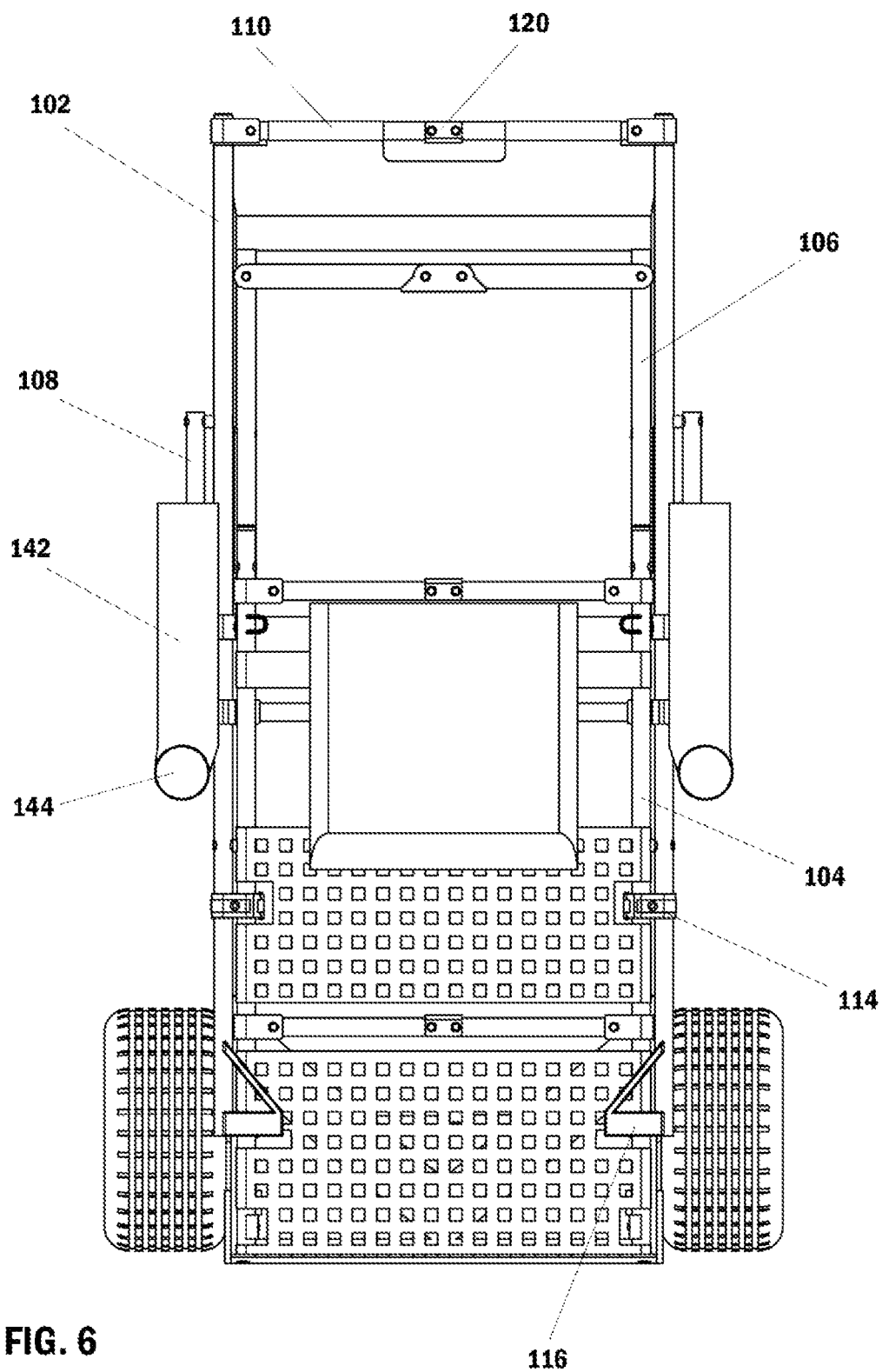
FIG. 6 is a front perspective view of a convertible hand truck and chair device in a hand truck orientation, as contemplated by the present disclosure.
Figure 7:
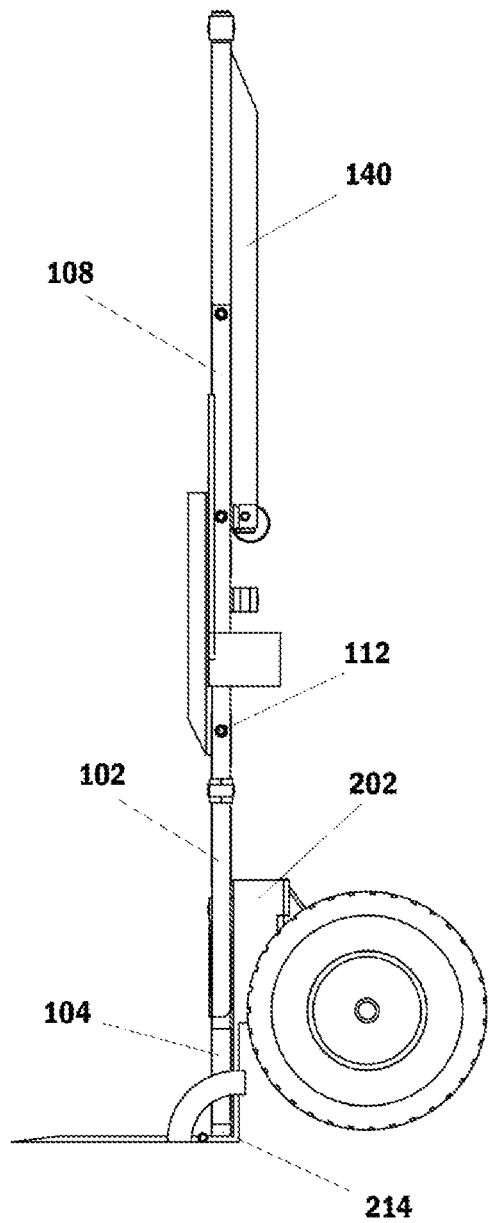
FIG. 7 is a left side elevation view of a convertible hand truck and chair device in a hand truck orientation, as contemplated by the present disclosure.
Figure 8:
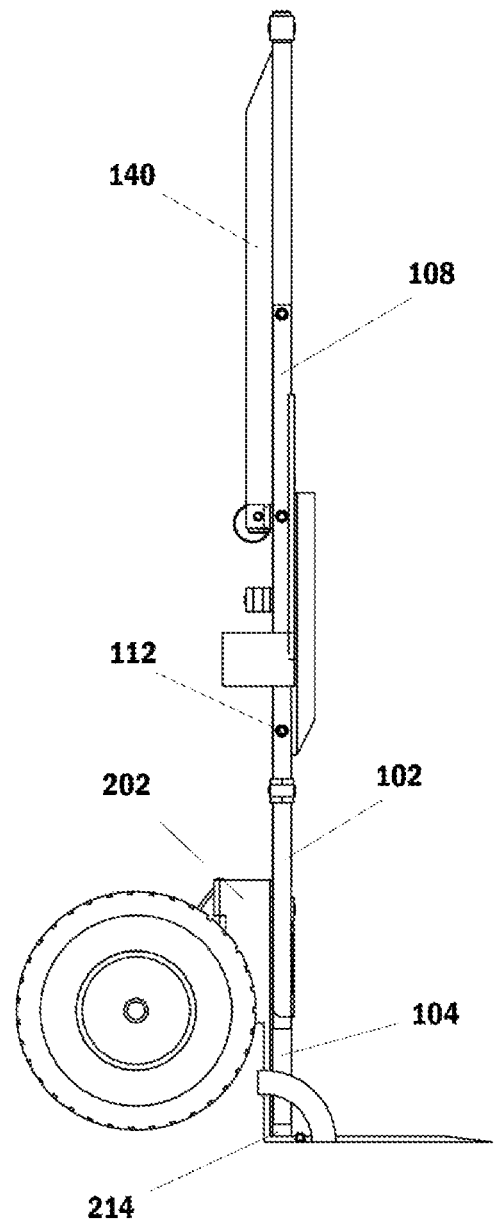
FIG. 8 is a right side elevation view of a convertible hand truck and chair device in a hand truck orientation, as contemplated by the present disclosure.
Figure 9:
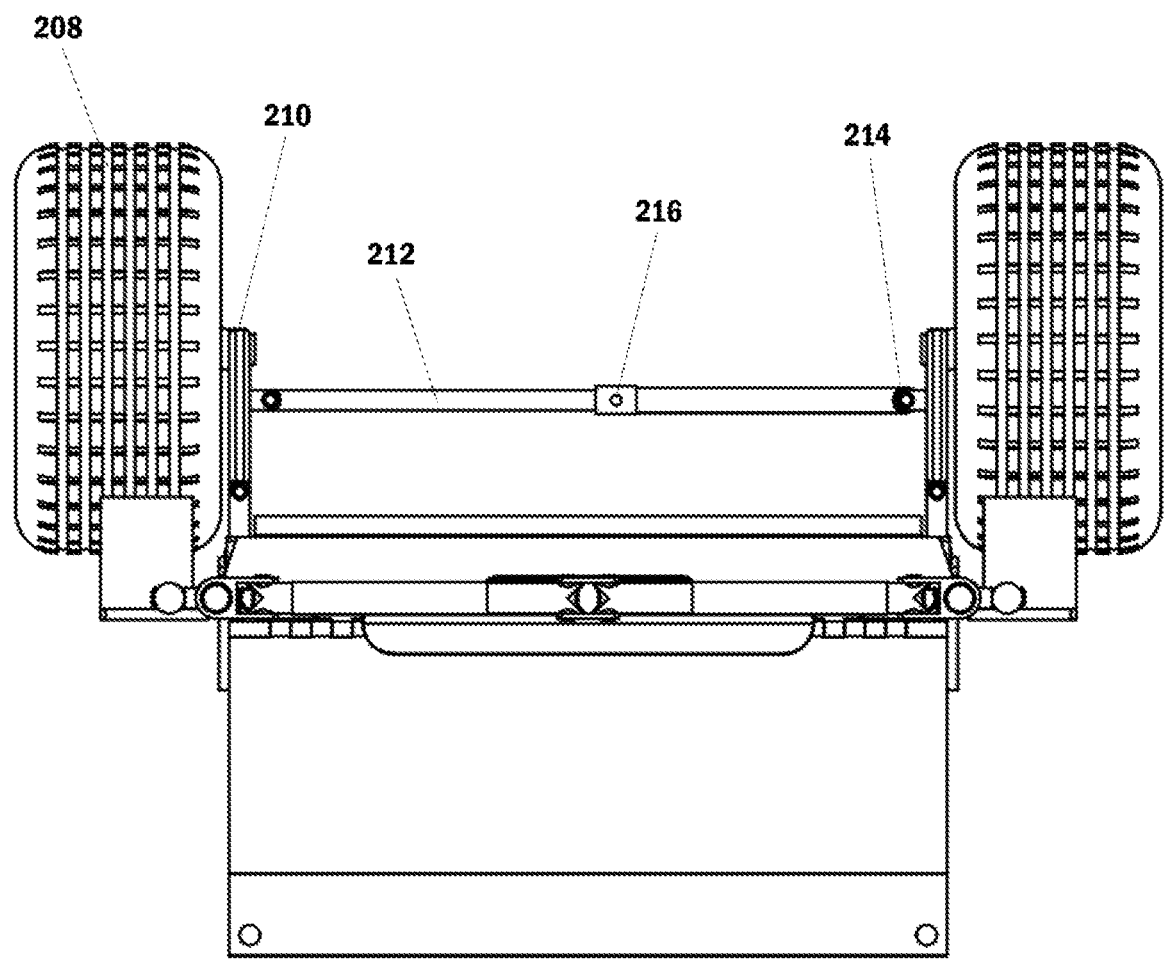
FIG. 9 is a top plan view of a convertible hand truck and chair device in a hand truck orientation, as contemplated by the present disclosure.
Figure 10:
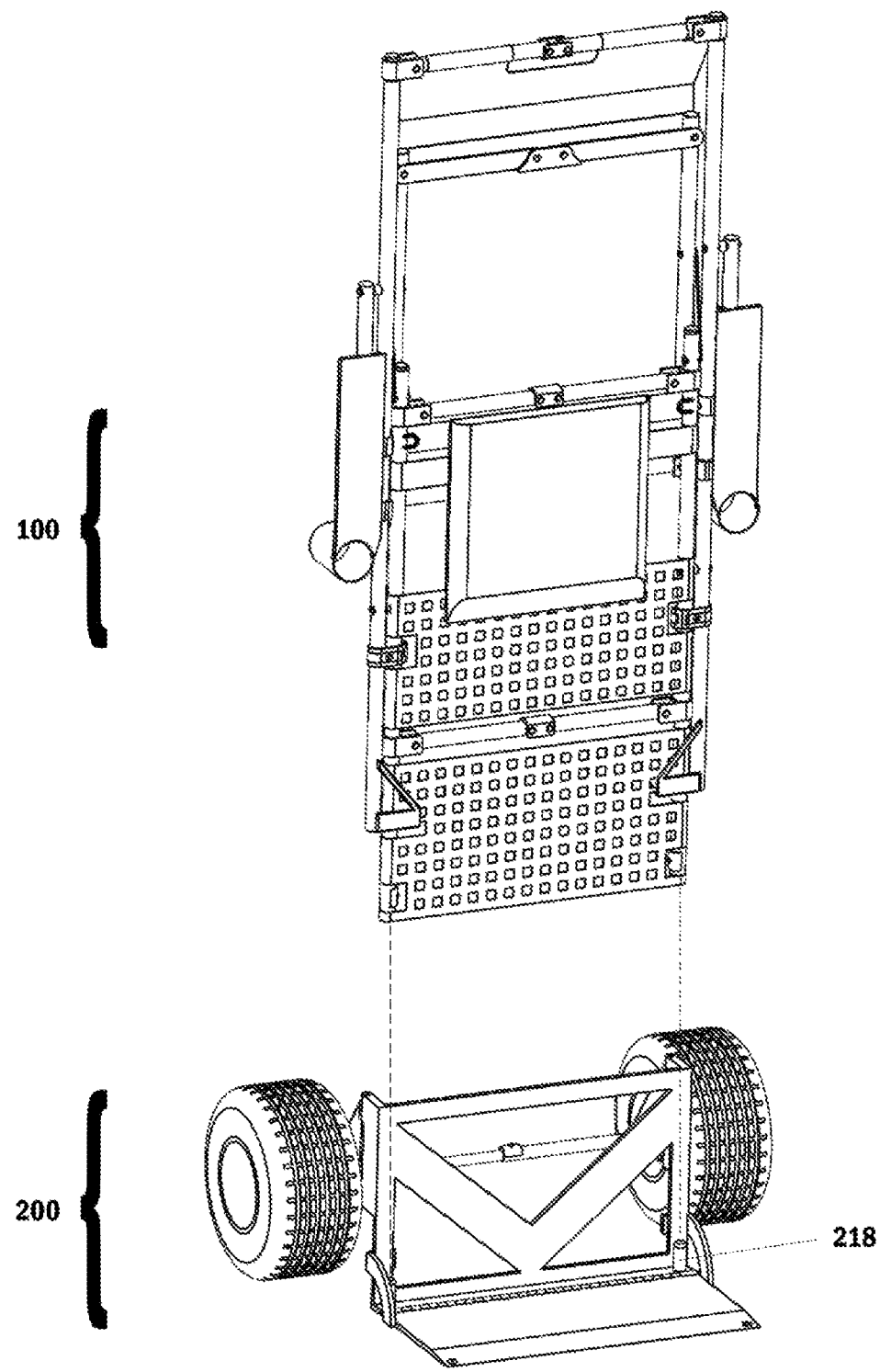
FIG. 10 is an exploded component view of a convertible hand truck and chair device in a hand truck orientation, as contemplated by the present disclosure.
Figure 11:
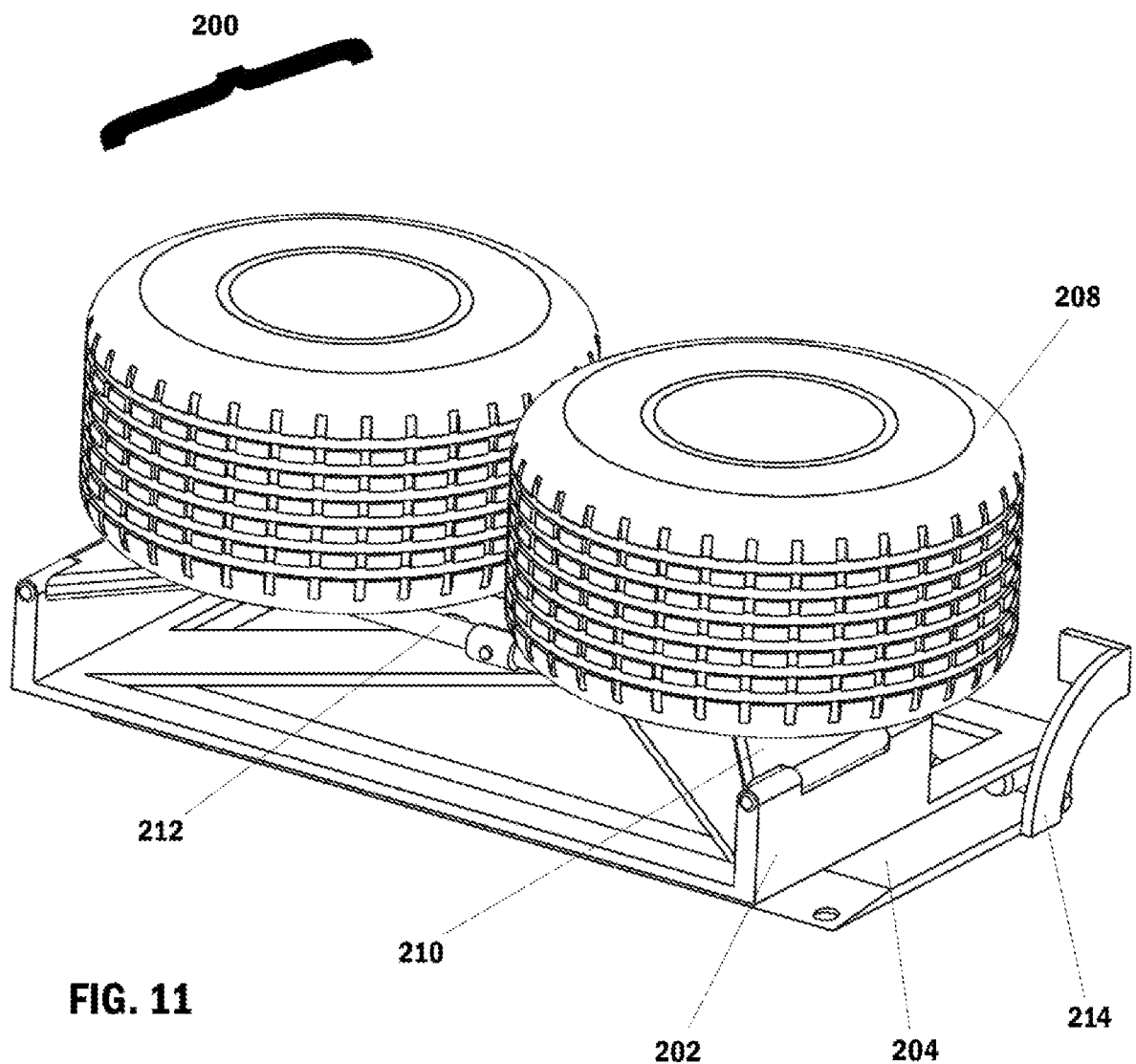
FIG. 11 is an isometric perspective view of a truck of a convertible hand truck and chair device in a folded orientation, as contemplated by the present disclosure.
Figure 12:
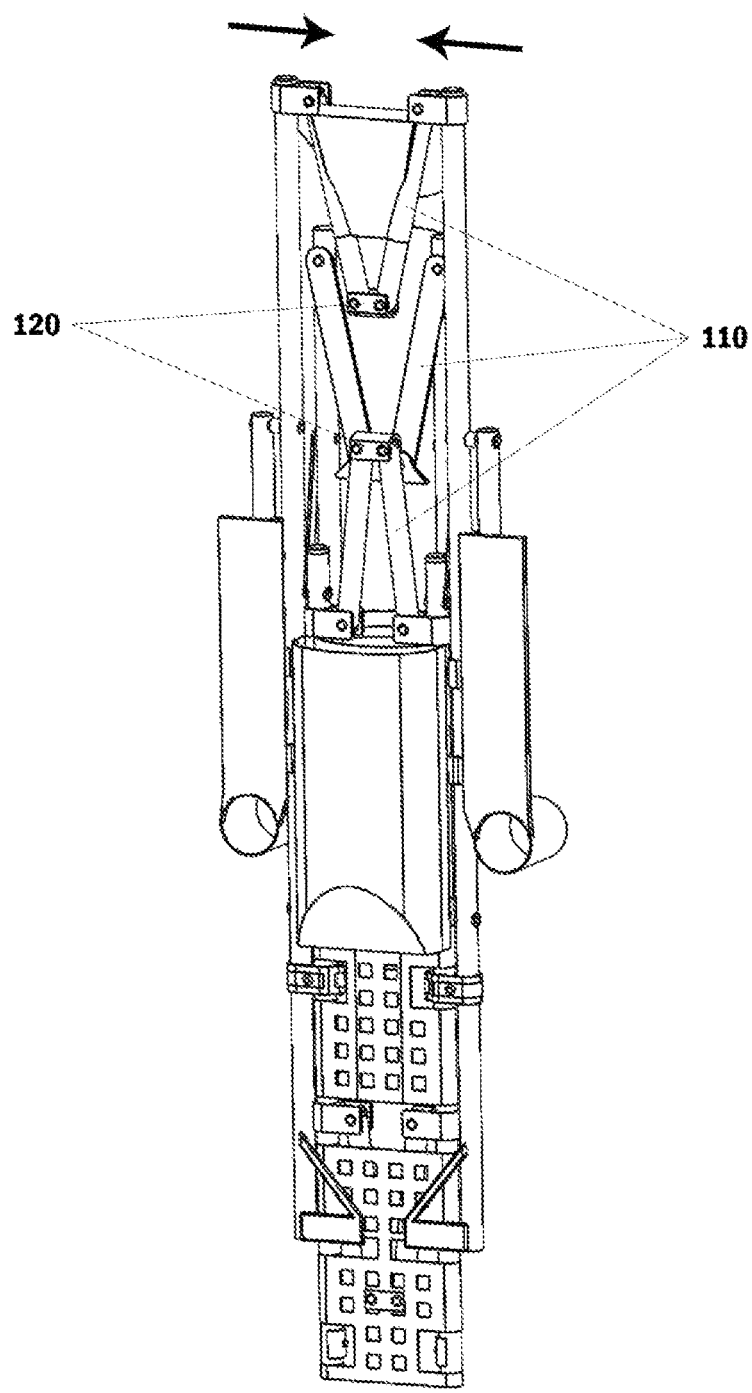
FIG. 12 is an isometric perspective view of a convertible hand truck and chair device in a collapsed orientation, as contemplated by the present disclosure.

The illustrations of FIGS. 1-12 illustrate a convertible hand truck and chair device, as contemplated by the present disclosure. The device may comprise, generally, a main body 100 reversibly attached to a truck 200. The main body 100 is intended to provide a hand truck support frame that may be convertible into a chair for sitting. The truck 200 is intended to provide a hand truck lift plate and wheeled assembly that may be convertible or removable to facilitate the conversion of the main body 100 into the chair orientation. The convertible hand truck and chair device main body 100 may further comprise a collapsible design that allows the main body 100 to compress into a narrower form for transporting.

The main body 100 may comprise a plurality of structural arms attached to one another by a plurality of hinges such that they may articulate relative to one another. The plurality of structural arms of the main body 100 may comprise, for example, a plurality primary arms 102, a plurality of secondary arms 104, a plurality of tertiary arms 106, a plurality of quaternary arms 108, and a plurality of crossbars 110. The plurality of hinges of the main body 100 may comprise, for example, a plurality of articulating hinges 112, a plurality of locking hinges 114, and a plurality of collapsing hinges 120.

The plurality of structural arms may comprise any appropriately-shaped arms having a length, a cross section, and a load bearing capacity. The length of the plurality of structural arms may vary as appropriate or as desired. The cross section of the plurality of structural arms may comprise any appropriate cross section such as, for example, circular, triangular, or square. The load bearing capacity of the plurality of structural arms may be determined by a cross section, a thickness, a material composition, or combinations thereof of the plurality of structural arms and may comprise any load bearing capacity appropriate to limit or prevent bending, cracking, breaking, or other structural failure of the plurality of structural arms.

The plurality of hinges may comprise any appropriate hinges known in the art such as, for example, strap hinges, butt hinges, spring-loaded hinges, concealed hinges, piano hinges, offset hinges, overlay hinges, hidden barrel hinges, scissor hinges, gate hinges, or the like. The plurality of articulating hinges 112 may comprise any appropriate hinges permitting relative movement of two components through an arced range of motion. The plurality of locking hinges 114 may comprise any appropriate hinges permitting relative movement of two components through an arced range of motion while limiting the minimum or maximum arc range or locking the two components into a relative position at either limit. The plurality of collapsing hinges 120 may comprise any appropriate hinges permitting relative movement of two components through an arced range of motion while limiting the minimum or maximum arc range or locking the two components into a relative position at either limit.

In one embodiment the main body 100 may comprise two of a plurality of primary arms 102, two of a plurality of secondary arms 104, two of a plurality of tertiary arms 106, and two of a plurality of quaternary arms 108. One each of the plurality of primary arms 102 may be attached to one each of the plurality of secondary arms 104 by one each of the plurality of articulating hinges 112 such that the arms may articulate through an arc relative to one another. One each of the plurality of tertiary arms 106 may also be attached to one each of the plurality of primary arms 102 by one each of the plurality of articulating hinges 112 such that the arms may articulate through an arc relative to one another.

One each of the plurality of tertiary arms 106 may then be attached to one each of the plurality of secondary arms 104 by one each of the plurality of locking hinges 114 such that the relative articulation of the arms relative to one another may be controlled and limited. One each of the plurality of quaternary arms 108 may also be attached to one each of the plurality of primary arms 102 by one each of the plurality of articulating hinges 112 such that the arms may articulate through an arc relative to one another and by one each of the plurality of locking hinges 114 such that the relative articulation of the arms relative to one another may be controlled and limited.

By this design the convertible hand truck and chair device may comprise a device that may be converted from a hand truck orientation to a chair orientation. The plurality of primary arms 102 may comprise the primary vertical structure of the hand truck orientation, and may comprise the front legs and vertical seat supports of the chair orientation. The plurality of secondary arms 104 may comprise the secondary vertical structure of the hand truck orientation, and may comprise the rear legs and horizontal seat supports of the chair orientation. The plurality of tertiary arms 106 may or may not provide vertical structural support in the hand truck orientation, and may comprise the horizontal seat structure of the chair orientation. The plurality of quaternary arms 108 may or may not provide vertical structural support in the hand truck orientation, and may comprise the horizontal arm rest support of the chair orientation.

The plurality of primary arms 102 may articulate relative to the plurality of secondary arms 104 from a substantially parallel orientation to a substantially perpendicular orientation. By this mechanism the plurality of primary arms 102 and plurality of secondary arms 104 may create an x-frame for the convertible hand truck and chair device in the chair orientation.

The two of the plurality of primary arms 102 may be connected to one another by a plurality of crossbars 110, the two of the plurality of secondary arms 104 may be connected to one another by a plurality of crossbars 110, and the two of the plurality of tertiary arms 106 may be connected to one another by a plurality of crossbars 110. In one embodiment the plurality of crossbars 110 may each comprise two bars connected to one another by a collapsing hinge 120 such that the arms may articulate through an arc relative to one another from a substantially parallel orientation to a substantially perpendicular orientation. By this design the plurality of crossbars 110 may reversibly increase and decrease an overall width of the convertible hand truck and chair device.

The main body 100 may further comprise a plurality of arm locks 116, which may comprise any appropriate mechanism for receiving two or more structural arms and reversibly binding them to one another. In one embodiment one each of the plurality of arm locks 116 may be fixedly attached to one each of the plurality of primary arms 102 and reversibly attached to one each of the plurality of secondary arms 104 when the two structural arms are positioned parallel to one another. The mechanism of attachment of the plurality of arm locks 116 may be by any appropriate physical means such as, for example, inserting, bolting, snapping, binding, or the like.

The main body 100 may further comprise a plurality of foot pads 118, which may comprise any appropriate mechanism for providing traction or a larger footprint to the convertible hand truck and chair device. The plurality of foot pads 118 may be attached to a bottom end of the plurality of primary arms 102, and may further comprise a design that limits the relative articulation of the plurality of primary arms 102 and secondary arms 104 by implementing, for example, interference tabs. The mechanism of attachment of the plurality of foot pads 118 to the plurality of primary arms 102 may be by any appropriate physical means such as, for example, welding, bolting, riveting, inserting, or the like.

The main body 100 may further comprise any appropriate accessories or modifications for providing additional functionality to the convertible hand truck and chair device. In one embodiment the main body 100 may further comprise a seat cover 140, which may be any appropriate flexible material for providing a seat bottom and seat back to the device such as, for example, nylon, fabric, tarp, leather, or the like.

In one embodiment the main body 100 may further comprise a plurality of arm rests 142, which may be attached to the plurality of quaternary arms 108 and may comprise any appropriate surfaces for providing arm support to a user such as, for example, a substantially flat rectangular plate. The plurality of arm rests 142 may further comprise a plurality of cup holders 144 for holding a drink of a user in the chair orientation.

In one embodiment the main body 100 may further comprise a handgrip 146, which may be any appropriate structure for lifting, pushing, or pulling the convertible hand truck and chair device. By way of example the handgrip 146 may comprise one or more notches in the seat cover 140 allowing a user to grip the uppermost crossbar 110, may comprise a thicker padded area on the uppermost crossbar 110 to provide additional hand protection to the user, or may comprise a structural projection from the uppermost crossbar that the user may grip.

In one embodiment the main body 100 may further comprise a storage pad 148, which may be any appropriate container for providing storage space or storage areas within or on the device.

In one embodiment the main body 100 may further comprise a plurality of cargo netting 150, which may be any appropriate material for preventing materials falling from, off, or through the device.

The truck 200 may comprise a structural truck frame 202 attached to a lift plate 204 and a plurality of wheels 208. The truck frame 202 may comprise any appropriate rigid frame suitable for supporting the lift plate 204 and wheels 208 and connecting the truck 200 to the main body 100. The lift plate 204 may comprise any appropriate rigid plate suitable for placing under a load and lifting or tilting the load for pushing or pulling.

The lift plate 204 may be attached to the truck frame 202 by a truck plate hinge 206, which may comprise any appropriate hinge known in the art such as, for example, strap hinges, butt hinges, spring-loaded hinges, concealed hinges, piano hinges, offset hinges, overlay hinges, hidden barrel hinges, scissor hinges, gate hinges, or the like. The truck plate hinge 206 may comprise any appropriate hinge permitting relative movement of the lift plate 204 through an arced range of motion while limiting the minimum or maximum arc range or locking the lift plate 204 into a relative position at either limit. The mechanism of attachment of the truck plate hinge 206 may be by any appropriate physical means such as, for example, inserting, bolting, snapping, binding, or the like.

The plurality of wheels 208 may be attached to the truck frame 202 by a plurality of wheel hinges 210, which may comprise any appropriate hinges known in the art such as, for example, strap hinges, butt hinges, spring-loaded hinges, concealed hinges, piano hinges, offset hinges, overlay hinges, hidden barrel hinges, scissor hinges, gate hinges, or the like. The plurality of wheel hinges 210 may comprise any appropriate hinges permitting relative movement of the plurality of wheels 208 through an arced range of motion while limiting the minimum or maximum arc range or locking the plurality of wheels 208 into a relative position at either limit. The mechanism of attachment of the plurality of wheel hinges 210 may be by any appropriate physical means such as, for example, inserting, bolting, snapping, binding, or the like.

The plurality of wheels 208 may be attached to the plurality of wheel hinges 210 by a plurality of wheel hubs. The plurality of wheel hubs may operate independently of one another or may be connected to each other by an axle 212. The axle 212 may further comprise an axle lock 216, which may be any lock appropriate for maintaining the length of the axle 212 when locked and for allowing the axle 212 to telescope into itself when unlocked. The axle 212 may be attached at either end to the plurality of wheel hubs by a plurality of axle hinges 214, which may allow the axle 212 to articulate relative to the plurality of wheel hubs or be removed from the plurality of wheel hubs. The mechanism of attachment of the axle 212 to the plurality of wheel hubs may be by any appropriate physical means such as, for example, inserting, bolting, snapping, binding, or the like.

One each of the plurality of wheels 208 may be reversibly attached to one each of the plurality of wheel hubs such that the plurality of wheels 208 may be removed or replaced as desired. The plurality of wheels 208 may vary in width, height, and tread pattern as desired for improved functionality on various surfaces. By way of example, the plurality of wheels 203 may comprise large wheels, small wheels, wheels for sand, wheels for rough terrain, or any other appropriate wheels. In one embodiment the plurality of wheels 208 may further comprise a ski receiver to which one each of a plurality of skis may be attached for traversing snow and ice.

One each of the plurality of wheels 208 may further comprise a motorized wheel, which may be driven by a drive motor or a hammer mechanism stored within the motorized wheel. In one embodiment a motorized wheel may be driven by a separate motor attached to the truck frame 202 and driving the axle 212.

The truck 200 may further comprise a plurality of body receiving posts 218, which may be any appropriate mechanism for receiving and attaching to the main body 100. By way of example, the plurality of body receiving posts 218 may comprise a plurality of projections attached to the truck frame 202 that may be inserted into an open bottom end of the plurality of primary arms 102. The mechanism of attachment of the plurality of body receiving posts 218 to the main body 100 may be by any appropriate physical means such as, for example, inserting, bolting, snapping, binding, or the like.

The convertible hand truck and chair device may further comprise a plurality of accessories and receivers. By way of example, one of the plurality of accessories and receivers may comprise an umbrella receiver, which may comprise any system appropriate for receiving, storing, holding, or anchoring an umbrella. Another one of the plurality of accessories and receivers may comprise a cell phone receiver, which may comprise any system appropriate for receiving, storing, holding, or anchoring a cell phone. Another one of the plurality of accessories and receivers may comprise a speaker receiver, which may comprise any system appropriate for receiving, storing, holding, or anchoring a speaker. One of the plurality of accessories and receivers may comprise an onboard speaker, which may comprise any system appropriate for playing audio inputs.

The convertible hand truck and chair device may further comprise a braking system, which may comprise any system appropriate for applying braking or locking force to the plurality of wheels 208. By way of example, the braking system may comprise a plurality of disc brakes, a plurality of drum brakes, a plurality of electric motor brakes, or the like.

The convertible hand truck and chair device may be substantially constructed of any suitable material or combination of materials, but typically is constructed of a resilient material or combination of materials such that the device is resistant to damage as a result of compression, twisting, heating, or submersion in water. As an example, and without limiting the scope of the present invention, various exemplary embodiments of the convertible hand truck and chair device may be substantially constructed of one or more materials of silicone, plastic, acrylic, polycarbonate, steel, aluminum, brass, fiberglass, carbon fiber, or combinations thereof. In some embodiments the various components of the device may be coated, lined, or otherwise insulated to prevent contamination of the device. In one embodiment the material of construction may vary from one component to the next within the system.

In one embodiment the convertible hand truck and chair device may comprise a resilient material of construction that either comprises a material having antimicrobial properties or comprises a layering of antimicrobial material or coating. Antimicrobial properties comprise the characteristic of being antibacterial, biocidal, microbicidal, anti-fungal, anti-viral, or other similar characteristics, and the oligodynamic effect, which is possessed by copper, brass, silver, gold, and several other metals and alloys, is one such characteristic. Copper and its alloys, in particular, have exceptional self-sanitizing effects. Silver also has this effect, and is less toxic to users than copper. Some materials, such as silver in its metallic form, may require the presence of moisture to activate the antimicrobial properties.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

I claim:

1. A convertible hand truck and chair device, comprising:
a main body;
a truck;
a plurality of arm locks;
a seat cover;
a plurality of quaternary arms;
a plurality of arm rests;
a plurality of cup holders;
a handgrip; and
a storage pad;
wherein said main body further comprises a plurality of primary arms, a plurality of secondary arms, a plurality of tertiary arms, and a plurality of crossbars;
wherein said truck further comprises a truck frame, a lift plate, a plurality of wheel hubs, and a plurality of wheels;
wherein one each of said plurality of primary arms is attached to one each of said plurality of secondary arms by an articulating hinge;
wherein one each of said plurality of primary arms is attached to one each of said plurality of tertiary arms by an articulating hinge;
wherein one each of said plurality of secondary arms is attached to one each of said plurality of tertiary arms by a locking hinge;
wherein a first of said plurality of primary arms is attached to a second of said plurality of primary arms by a first plurality of said plurality of crossbars;
wherein a first of said plurality of secondary arms is attached to a second of said plurality of secondary arms by a second plurality of said plurality of crossbars;
wherein a first of said plurality of tertiary arms is attached to a second of said plurality of tertiary arms by a third plurality of said plurality of crossbars;
wherein said main body is reversibly attached to said truck;
wherein one each of said plurality of primary arms is attached to one each of said plurality of quaternary arms by an articulating hinge;
wherein one each of said plurality of arm rests is attached to one each of said quaternary arms;
wherein one each of said plurality of cup holders is attached to one each of said plurality of arm rests;
wherein said lift plate is attached to said truck frame by a locking hinge;
wherein one each of said plurality of wheel hubs is attached to said truck frame by a locking hinge;
wherein one each of said plurality of wheels is attached to one each of said plurality of wheels hubs;
wherein one each of said plurality of crossbars further comprises a collapsing hinge; and
wherein said truck further comprises a plurality of body receiving posts.

2. The invention of claim 1, further comprising:
a plurality of cargo netting.

3. The invention of claim 2, further comprising:
an axle;
wherein a first of said plurality of wheel hubs is attached to a first end of said axle by a first axle hinge; and
wherein a second of said plurality of wheel hubs is attached to a second end of said axle by a second axle hinge.

4. The invention of claim 3,
wherein one each of said plurality of wheels is reversibly attached to one each of said plurality of wheels hubs.

5. The invention of claim 4, further comprising:
a plurality of motorized wheels.

6. The invention of claim 5, further comprising:
a plurality of accessories and receivers.

7. The invention of claim 6, further comprising:
a braking system.

* * * * *